April 22, 1969     G. A. PETERSEN     3,439,883

TENSIONER BULL WHEEL SHAFT STRUCTURE

Filed Dec. 13, 1966

INVENTOR.
GERALD A. PETERSEN
BY Julian Caplan
ATTORNEY

United States Patent Office 3,439,883
Patented Apr. 22, 1969

3,439,883
TENSIONER BULL WHEEL SHAFT STRUCTURE
Gerald A. Petersen, Cupertino, Calif. (% Peterson Engineering Co. Inc., 950 Kifer Road, Sunnyvale, Calif. 94086)
Filed Dec. 13, 1966, Ser. No. 601,453
Int. Cl. B65h *59/18;* E21c *29/16;* F16h *55/36*
U.S. Cl. 242—155         2 Claims

ABSTRACT OF THE DISCLOSURE

A single, large diameter, tubular shaft supports a plurality of cable tensioner bull wheels, the shaft being supported only by bearings at each end to reduce the overall shaft length and permit the same to be mounted transversely on a vehicle whose width complies with highway use regulations. The wheels are mounted on the shaft so that they may turn through a small angle relative to the shaft and relative to each other to accomplish phase adjustment when a plurality of conductors are strung simultaneously and one sags due to operating conditions. The outside diameters of the wheels are made slightly different from each other so that in normal operation there is a continuous moderate relative turning and hence when phase adjustment must be made there is no grabbing or jerking movement of the wheel being adjusted relative to the shaft.

---

This invention relates to a new and improved tensioner bull wheel shaft structure. The shaft is of large diameter and of sufficient length to accommodate a plurality of bull wheels, each of which is turnable on the shaft so that the wheels may adjust angularly relative to each other and relative to the shaft. The ends of the shaft are mounted in bearings, but a feature of the invention is the fact that no bearings are provided intermediate the ends of the shaft and, therefore, the overall length of the shaft may be reduced over conventional structures wherein bearings are provided at each side of each wheel.

The two shafts supporting the bull wheels are subjected to tremendous compression loads because each cable passes around two wheels, each on a separate shaft, and the resultant forces tend to draw the two shafts toward each other. Such compressive force for four foot diameter wheels in a machine having a rated 10,000 lb. per conductor braking force is calculated to apply a compressive load on the shaft of 60,000 lbs. approximately, and for four wheels per shaft, the load is 240,000 lbs. approximately. In prior practice, each wheel has been supported on an individual shaft and each shaft supported at each end by a bearing which must have considerable length to accommodate the load. The result has been a large, expensive structure which has an overall length axially of the shafts which requires a vehicle too wide to comply with highway use regulations in many localities. The present invention simplifies the structure, permits the wheels to be mounted only on a pair of shafts, permits each shaft to be supported by only two bearings—one on each end—and thus reduces the shaft length.

A further feature of the invention is the provision of means for mounting the bull wheels on the shaft in such manner that they generally turn with the shaft but can turn relative to the shaft and relative to each other, when required, for phase adjustment of one conductor relative to the other.

Tension stringing of the electrical conductors provides machines whereby overhead lines are strung while the conductors are maintained in the air at all times to avoid damage. Ordinarily, a pulling line of wire rope is attached to the lead end of the conductor, the rope being run through stringing sheaves attached to the crossarms of poles or towers. Any damage which may occur by reason of contact with the ground or other obstructions is absorbed by the pulling rope. In the course of the operation, a tension puller machine is attached to one end of the line and a tension braking machine to the opposite end. Each of these machines is provided with a pair of bull wheels for each conductor. Bull wheels of the puller are equipped with power for turning with a force greater than the braking action at the other end of the line. If the equipment is properly operated, the conductor never touches the ground at any time during the stringing operation. Thus, damage to the conductor is avoided and this is of importance in that damage results in corona loss and also sets up radio interference when the conductor transmits high voltage. Furthermore, the use of tension stringing avoids obstructions, such as preexisting power and telephone lines, roads, streets and railroad tracks which must be traversed by the line being strung. The present invention differs from previous tensioners in one respect, in that it is intended for use primarily where a plurality of conductors are strung simultaneously. More importantly, the machine can string up to four conductors simultaneously.

In accordance with conventional practice, when the machine is used for stringing several lines, the lines are directed from their reels around the bull wheels of the tensioner and thence through a plurality of sheaves on the crossarms or on the poles and thence to the tension puller. The bull wheels of the tensioner are connected to brakes to which a braking force is applied, which insures that the pulling line and also the conductor to which the trailing end of the pulling line is attached is maintained at predetermined tension.

One of the features and advantages of the present invention is the fact that it simplifies phase control. It will be understood that ordinarily one of the conductors at any given instant may tend to sag behind the other by reason of operating conditions. Accordingly, tensioner machines provide means for controlling the phase of the four conductors to maintain an equal amount of slack on each of the lines. Such phase control involves turning of the bull wheels relative to each other. The present invention provides means for such turning by mounting the wheels on a single shaft in such manner that each wheel can turn relative to the shaft independently of the others to accommodate phase control, but ordinarily the wheels turn together with the shaft.

The present invention provides a simple large-diameter hollow shaft supported at each end by large-diameter heavy duty bearings. Up to four bull wheels are mounted on the shaft with appropriate means, such as bushings, enabling the wheels to turn in angular position relative to the shaft. Spacer collars are positioned between the wheels to accommodate end thrust, and also to space the wheels apart to permit access to the wheels. The spacers also accommodate sprockets which are fixed to the wheels and provided with chains connecting the wheels to braking means, and also to means for turning the wheels relative to each other.

A further feature of the invention is the provision of means to reduce jerking of the lines when one wheel must be slowed to bring the various lines level. The outside diameter of each wheel is made slightly different from the other wheels with the result that the wheels are continuously turning relative to the shaft. Hence there is no sudden turning after a period of no relative movement and this avoids a "breakaway" problem. A convenient means for accomplishing unequal wheel diameters while using standard parts is to install arcuate or circular metal plates or belts (herein termed "shims") between the wheel proper and the replaceable, grooved segments lined with a resilient material such as synthetic material which are placed end-to-end around the periphery. By using different shim thicknesses on the various wheels, the diameter variations are achieved and the segments are sufficiently resilient to accommodate such variations.

Other objects of the present invention will become apparent upon reading the following specification and referring to the accompanying drawings in which similar characters of reference represent corresponding parts in each of the several views.

Figure 1:
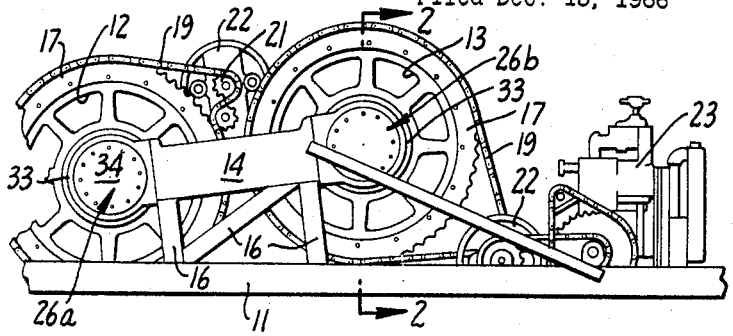
FIG. 1 is a schematic side elevation of a tensioner machine in which the present invention is incorporated.

The tensioner shown schematically in FIG. 1 provides a frame 11 having a plurality of forward and rearward bull wheels 12, 13 mounted on forward and rearward shaft structures 26a, 26b, one at the front and one at approximately the middle of the frame 11, with a spacer 14 holding the shafts a proper distance apart, spacer 14 being supported from the frame 11 by struts 16. Each wheel 12 or 13 is provided with an annular sprocket 17, attached to one end thereof by bolts 18. A chain 19 passes around each sprocket 17, and also around a sprocket 21 on a brake mechanism 22. A prime mover 23 mounted on frame 11 drives a pump (not shown), which provides brake fluid under pressure for the brake 22 under the control of the operator. Phase control means is also driven from prime mover 23 to turn the bull wheels angularly relative to each other, reference being made to copending application Ser. No. 559,255, filed June 21, 1966, for Dual Tensioner Phase and Brake Control, for structural details of one of several means for accomplishing this result.

Each of the four rear bull wheels 13 is mounted on a single shaft structure 26b, and a single similar shaft structure 26a is used to mount the four front wheels 12. It will be understood that the number of wheels which is accommodated by the shaft is subject to variation. However, a feature of the invention is the fact that four wheels can be mounted on a single shaft 26a or b for an overall length of approximately eight feet, the maximum width of the vehicle which satisfies highway width regulation. Shaft structure 26b in its central portion comprises a length of seamless steel tubing 27. At either end the tubing 27 is welded to an end cap 28, having a shoulder 29 to receive the end of tubing 27 and a reduced diameter outer end 31 which is received in dual spherical bearing 32. Bearing 32 is received in an annular bearing outer housing 33 and housing 33 is supported by spacer 14. End caps 34 close off the end of housing 33 and disk 36 secures the bearing 32 to the shaft 26b.

Each bull wheel 13 is substantially identical, except as hereinafter appears. The wheel has an inner hub 41 which is annular, and has an inside diameter greater than the outside of tubing 27. At either end of hub 41 is a bushing 42 of brass or other bearing material, having an outward extending end flange 43. An outer rim 44 is spaced from hub 41 by a plurality of ribs 46 formed with windows 45 to reduce weight. Attached to rim 44 are peripheral segments 47 secured thereto by bolts 48. The periphery of segment 47 is formed with grooves 49 accommodating the conductor being strung. As illustrated herein, there are six grooves 49, but it will be understood that different numbers of grooves may be used. The segments 47 may be constructed and secured in accordance with Patent No. 2,954,702, or by other suitable means. The external surface of the segments 47 is such as to frictionally engage the conductor to prevent slippage of the conductor relative to the bull wheel.

Interposed between the segments 47 and outer rims 44 of three of the wheels are arcuate or circular shims 50a, b, c, each of different thickness and hence the O.D. of segments 47, 47a, b, c differs. Shims 50 may be of aluminum or other metal plate or of belting or other flexible material. The different wheel diameters cause the wheels to continuously turn slightly relative to each other during normal operation. Hence jerking when phase adjustment must be made is avoided.

Attached to one end of each bull wheel 13 is annular sprocket 17, which is bolted to rim 44 by means of bolts 18. Bushings 42 permit slippage of the wheels 13 relative to shaft 26, and such slippage is further facilitated by the provision of grease fittings 51, which provide lubricant into the annular space 52 between the inner end of bushings 42.

Figure 2:
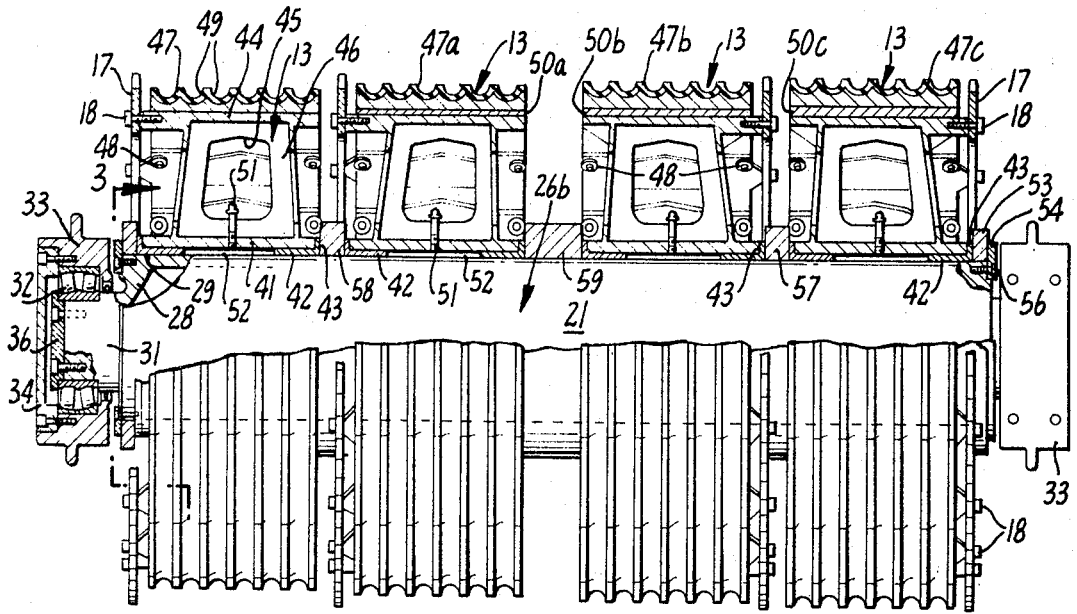
FIG. 2 is an enlarged elevational view, partly broken away in sections along line 2—2 of FIG. 1 showing a plurality of bull wheels mounted on a single shaft in accordance with the present invention.
Figure 3:
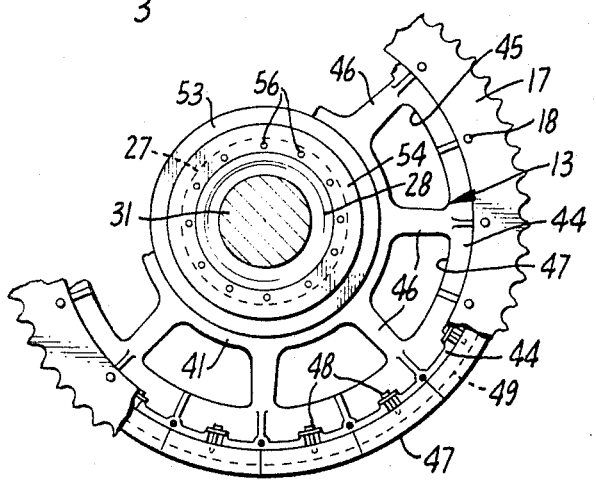
FIG. 3 is a fragmentary sectional view taken substantially along the line 3—3 of FIG. 2.
Figure 4:
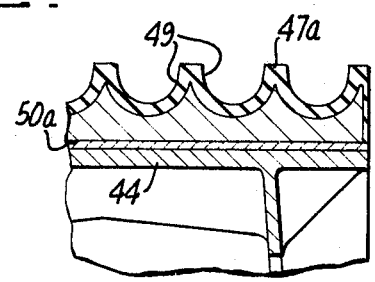
FIG. 4 is an enlarged fragmentary sectional view of a portion of the structure of FIG. 2.

At either end of the shaft 26 is a thrust collar 53 which engages the flange 43 of the outermost bushing 42. Collar 53 is held in place by a ring 54 around its outer edge held in place by screws 56 which engage the cap 28. Between the two right-hand bull wheels 13, shown in FIG. 2 is a spacer collar 57, and between the two left-hand wheels 13 is a second spacer collar 58. Collar 59 is positioned between the two center bull wheels. The width of collar 59 is greater than the other collars mentioned to permit access to the interior of the two center bull wheels for lubrication and for access to the bolts 48 when it is necessary to change segments 47. Preferably, the grooves 49 in the bull wheels 12 should be staggered relative to the corresponding grooves in wheels 13 by one-half the width of a groove 49. It will be noted that the thickness of collars 53 and 57 differs by about such dimension. Thus in the forward bull wheel shaft structure 26a the collars 53 and 47 are interchanged from the structure 26b to provide for the staggering of the grooves.

In operation conductors (not shown) are passed around the forward and rear bull wheel segment grooves 49 in conventional manner. The conductors are pulled by other equipment, causing wheels 12, 13 and their shafts 26 to turn in bearings 32. Because of the unequal O.D. of the wheels, they continuously turn angularly relative to each other, bushings 42 facilitating such movement. A braking force is applied to each conductor through its brake 22, which is connected to wheel 12 or 13 by chain 19. When one conductor tends to sag relative to the others, it must be slowed until it comes level with the others. Such phase control may be accomplished by various means. As it occurs, the wheels 12 and 13 for this particular conductor turn angularly relative to the others. Because of the continuous turning of the wheels occasioned by their different diameters, phase adjustment does not involve a sudden relative angular movement of the wheel and its shaft and hence grabbing or jerking and consequently harm to the conductors is avoided.

Although the foregoing invention has been described in some detail, by way of illustration and example for purposes of clarity of understanding, it is understood that certain changes and modifications may be practiced within the spirit of the invention and scope of the appended claims.

I claim:

1. A multiple bull wheel mounting structure comprising a shaft, a plurality of bull wheels mounted on said shaft for relative turning movement, each said bull wheel having a rim and groove-forming segments around said rim, at least some of said wheels having shims between said rim and said segments, shims on different wheels of different thicknesses, the circumference of each wheel around said segments differing.

2. A multiple bull wheel mounting structure comprising a frame, a shaft, at least four bull wheels each having a hub and a peripheral rim, said shaft passing through and comprising a support for the hubs on each of said four bull wheels, said hubs angularly turnable relative to said shaft independently of each other; spacer collars around said shaft between said bull wheel hubs, and one bearing at each end of said shaft, said bearings solely supporting said shaft on said frame, each said bull wheel having a plurality of grooved segments spaced around said rim, means securing said segments to said rim, and shims between the segments of some of said bull wheels and said rims, the thickness of said shims varying from bull wheel to bull wheel, the circumferences of each bull wheel differing.

References Cited

UNITED STATES PATENTS

| 2,947,494 | 8/1960 | Merritt. |
| 3,232,558 | 2/1966 | Barkley. |
| 3,241,817 | 3/1966 | Goode. |

FOREIGN PATENTS 868,969  5/1961  Great Britain.

STANLEY N. GILBREATH, *Primary Examiner.*

U.S. Cl. X.R.

254—134.3; 74—230.3, 230.9